United States Patent Office 3,364,044
Patented Jan. 16, 1968

3,364,044
GELATINE COMPOSITIONS CONTAINING PENTAERYTHRITOL ESTERS OF PHOSPHORIC ACIDS
Herbert Grabhöfer, Cologne-Flittard, Hans Ulrich, Leverkusen, Wolfgang Himmelmann, Cologne-Stammheim, Heinz Meckl, Cologne-Flittard, Erich Böckly, Cologne-Stammheim, and Eberhard Günther, Leverkusen, Germany, assignors to AGFA Aktiengesellschaft, Leverkusen, Germany, a corporation of Germany
No Drawing. Filed July 9, 1963, Ser. No. 293,855
Claims priority, application Germany, Aug. 20, 1962, A 40,977
10 Claims. (Cl. 106—136)

ABSTRACT OF THE DISCLOSURE

Photographic layers containing gelatin, such as separation or filter layers or silver halide emulsion layers, or protective or backing layers for photographic films and papers, in which the gelatin is plasticized with phosphoric acid esters of both pentaerythritol and polymeric ethylene glycols.

---

This invention relates to pentaerythritol esters of phosphoric acid and to compositions containing the same. More especially this invention relates to gelatine compositions, especially photographic gelatine layers, which are plasticized with said esters.

The principal binding agent used for the preparation of photographic hydrophilic colloid layers, such as light-sensitive silver halide emulsion layers, protective layers, filter layers and/or intermediate layers for photographic light-sensitive papers or films is gelatine. Since strong tensile forces manifest themselves with relatively strong drying out of the gelatine-containing layers and these lead to deformation, numerous investigations have been carried out over many years to find additives to serve as gelatine plasticizers for improving the undesirable mechanical properties of dry gelatine layers.

Aqueous hydrosols of copolymers of acrylic acid esters, acrylonitrile, acrylamide and other polymerizable monomers as well as graft polymers of gelatine derivatives with acrylic acid esters and other polymerizable monomers have been used as plasticizers. The action of such compounds can be imagined as being due to the copolymers, which are incorporated in the form of extremely fine droplets, causing pliability of the layers because of the elasticity or plasticity imparted thereto which pliability can be varied by varying the ratio of the monomers used for the production of said copolymers or graft polymers. The optical turbidity of the layers caused by the incorporation of the plasticizers in form of a heterogeneous phase cannot be eliminated especially in the wet condition and proves to be disadvantageous with layers for the production of color images.

Apart from the said copolymer dispersions, there are gelatine plasticizers which are homogeneously miscible with gelatine and form single-phase systems therewith. In the simplest case, glycerine and other polyhydric alcohols can be used. These compounds act as plasticizers because of their hygroscopic properties. With high moisture contents, however, the layers are no longer resistant to touch and, with low moisture contents, they extract the residual moisture from the gelatine, so that the latter becomes extremely brittle. Other compounds proposed as plasticizers for gelatine are fatty acid amides, moveover cyclic amides, such as caprolactam and their acylation products. They have the disadvantage of only being effective in the layer prior to processing, since they are not firmly anchored and can diffuse out of the layer.

Similar conditions are met when using oligomeric and polymeric derivatives of ethylene oxide. Polyethylene glycols as well as their esters and ethers, moreover condensation products of dibasic carboxylic acids and polyalkylene oxides are also known as plasticizers for gelatine layers. Most of the polyethylene oxide derivatives can however be washed out of the layers and only exhibit their plasticizing action before processing. Compounds with a higher degree of polymerization cannot be used, since they cause a fogging with many silver halide emulsion layers. Simple phosphoric acid esters containing ethylene oxide radicals have also been described as plasticizers, but these are also only effective before the processing of the photographic material. It is only by the use of polyethylene oxide monoethers containing alkyl radicals of a higher carbon number in the production of the phosphoric acid esters that plasticizers are obtained which are fast to diffusion. The disadvantage of these phosphoric acid esters is that they are relatively sensitive to hydrolysis and the phosphoric acid semiesters which are formed during hydrolysis can lead in color photographic layers to a destruction of the color images. In addition, although the compounds are certainly miscible in aqueous solution with gelatine, they are precipitated in the form of an oily coating on the surface of the layer when it dries and this proves to be a serious disadvantage in the production of photographic materials.

It has now been found that compounds which can be used with advantage as gelatine plasticizers are those which correspond to the general formula

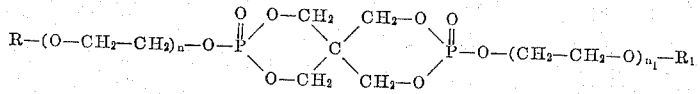

in which R and $R_1$ represent alkyl, aryl or aralkyl groups and $n$ and $n_1$ are large than or equal to 1, advantageously 2–20.

Suitable alkyl radicals are saturated or unsaturated alkyl radicals having 1–20 carbon atoms, e.g. methyl-, ethyl-, propyl-, butyl, amyl, allyl-, decyl-, dodecyl-, octadecyl-, octadecenyl radicals. Suitable aryl radicals are phenyl radicals, phenyl radicals which are substituted by alkyl radicals having 1–20 carbon atoms, alkoxy radicals with 1–20 carbon atoms in the alkyl groups, halogen atoms, such as chlorine or bromine atoms, furthermore naphthyl radicals, diphenyl radicals, diphenyl-oxide radicals, diphenylmethane radicals. Suitable aralkyl radicals are benzyl radicals, the phenyl group of which may be substituted, e.g. by alkyl radicals, alkoxy groups or halogen atoms.

The aforementioned compounds have the maximum stability with respect to hydrolytic agents. In addition, they are resistant to diffusion, so that a photographic material produced therewith, even after processing, still contains active plasticizers. The phosphoric acid derivatives according to the invention have also proved to be photographically neutral and in particular they do not produce any increased fogging values with highly sensitive emulsions. They are compatible with gelatine, even in the dry state, and do not precipitate on the surface of the layer. An additional advantage of the compounds according to the invention is that they reduce the viscosity of silver halide emulsions or gelatine solution containing color couplers having alkyl radicals with 10 to 20 carbon atoms so that higher coating speeds become possible.

The plasticizing action of the compounds according to the invention is maintained even after the moisture content of the colloid layers has been reduced to a low level. Since the additives according to the invention are not washed out of the gelatine layers during the photographic processing, the tendency to curling of photographic films and papers containing these plasticizers is reduced before and after processing. Furthermore, the brittleness of such photographic materials is reduced. Due to the reduction of the tensile forces in the gelatine, the dimensional stability of the films is also improved.

The compounds according to the invention may be added to the silver halide emulsions or other casting solutions containing gelatine, either in the form of alcoholic or aqueous solutions or in the form of aqueous solutions containing gelatine. The amount to be used is 2–50%, advantageously 5–30% by weight, calculated on the dry weight of the gelatine present in the layer to be plasticized. The usual casting or coating formulae can be maintained and hardening of the layers is not influenced by the addition. The compounds are compatible with the color couplers used for color photography, both with those which are diffusion-resistant and water-soluble and those which are water-insoluble and are applied in the form of emulsions, and do not disturb the color coupling in the color photographic process.

The use of the compounds is not restricted to photographic layers containing silver halide. They can also be used with advantage with gelatine containing separation layers or filter layers with photographic multi-layer materials containing at least one silver halide emulsion layer, furthermore for protective layers and backing layers of photographic films and papers.

Suitable compounds are for example substances of the following formulae:

then for 1 hour at 50° C. After cooling, the mixture is poured onto ice, and made weakly acid with twice normal sulphuric acid. Saturated common salt solution is then added thereto and it is extracted several times with methylene chloride. The combined extracts are dried over potassium carbonate and completely concentrated by evaporation. Any volatile constituents which may still be adhering are removed by heating in vacuo. Yield: 308 grams.

COMPOUND II

This compound is prepared in a manner analogous to compound I by reacting 580 grams of triethylene glycol monodecyl ether and 500 grams of pyridine with 300 grams of pentaerythritol-bis-(phosphoric acid monochloride). Yield: 720 grams.

COMPOUND III

This compound is prepared in a manner analogous to compound I by reacting 1320 grams of decaethylene glycol p-nonylphenyl ether and 500 grams of pyridine with 300 grams of pentaerythritol-bis-(phosphoric acid monochloride). Yield: 1260 grams.

COMPOUND IV

This compound is prepared in a manner analogous to compound I by reacting 900 grams of hexaethylene glycol monododecyl ether and 500 grams of pyridine with 300 grams of pentaerythritol-bis-(phosphoric acid monochloride). Yield: 850 grams.

COMPOUND V

This compound is produced in a manner analogous to compound I by reacting 2040 grams of heptadecaethylene

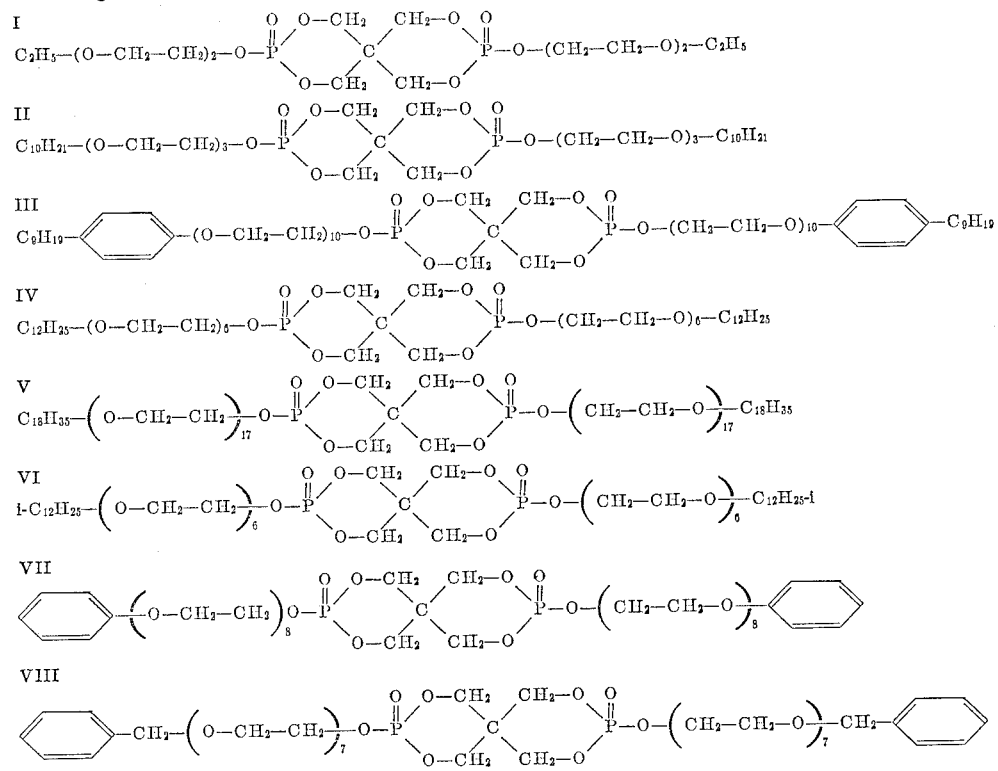

The compounds can be obtained as follows:

COMPOUND I 300 grams of pentaerythritol-bis-(phosphoric acid monochloride), the preparation of which is described in Belgian patent specification 597,191, are introduced in portions and with stirring into a mixture of 268 grams of diethylene glycol monoethyl ether and 234 grams of dry pyridine. The reaction mixture is stirred with exclusion of moisture, first of all for 5 hours at room temperature and glycol monooleyl ether and 300 grams of pentaerythritol-bis-(phosphoric acid monochloride) in 500 grams of pyridine. Yield: 1540 grams of a waxlike substance.

COMPOUND VI

This compound is produced in a manner analogous to compound I by reacting 900 grams of hexaethylene glycol mono-iso-dodecyl ether with 300 grams of pentaerythritol-bis-(phosphoric acid monochloride) in 500 grams of pyridine. Yield: 870 grams of a highly viscous oil.

COMPOUND VII

This compound is produced in a manner analogous to compound I by reacting 892 grams of octaethylene glycol monophenyl ether and 300 grams of pentaerythritol-bis-(phosphoric acid monochloride) in 500 grams of pyridine. Yield: 775 grams of a highly viscous oil.

COMPOUND VIII

This compound is produced in a manner analogous to compound I by reacting 832 grams of heptaethylene glycol monobenzyl ether and 300 grams of pentaerythritol-bis-(phosphoric acid monochloride) in 500 grams of pyridine. Yield: 680 grams of a highly viscous oil.

For the production of mixed esters it is possible to react the pentaerythritol-bis-(phosphoric acid monochloride) with equimolar proportions of two different polyethylene glycol ethers.

Example 1

To separate portions of a mixture of 100 cc. of a photographic emulsion which contains

| | Grams |
|---|---|
| Silver halide | 3.5 |
| Gelatine | 8 |
| 1-hydroxy-4-sulfonic acid-2-naphthoic acid heptadecylamide (color coupler) | 2 | are added, respectively 5, 7.5, 10 and 20% by weight of plasticizer IV, calculated on gelatine. The mixtures are cast onto a cellulose triacetate support, which is provided with a gelatine subbing layer and the layers are dried at room temperature. The thickness of the dried layer is 18–20μ. Test strips with a width of 1.5 cm. and a length of 30 cm. are then cut and these strips are allowed to stand for 48 hours in an environment of 36% relative air humidity and 22° C. The film strips obtained are tested as regards their brittleness by means of the testing method hereinafter described. The test takes place under the same conditions.

The film strips are drawn with the layer side outermost over two ball-mounted guide rollers (diameter 5 mm.), which bend the film twice at right angles at a distance of 1.5 cm. The film is tensioned by a weight of 1 kg. and is periodically drawn over the two guide rollers by an arrangement of eccentrics. With each stroke, the film is subjected to strong mechanical stress and breaks after a certain number of strokes. The latter is determined automatically and provides a value for the mechanical quality of the film, since the higher the value obtained, the greater is the mechanical quality of the film. The values set out below are average values of 4 measurements in each case. With values higher than 1500, the test was not continued, since they are only reached by films of outstanding quality and in addition the brittleness of the support participates to too strong a degree in the measurement at such values.

RESULT

| Addition, percent: | Number of strokes |
|---|---|
| 0 (control) | 210, specimen 1 |
| 5 | 710, specimen 2 |
| 7.5 | 820, specimen 3 |
| 10 | 960, specimen 4 |
| 20 | >1500, specimen 5 |

These values show the great reduction which results in the brittleness as a result of adding the plasticizer. Even with an addition of 20%, the surfaces of the layer are satisfactory and without any traces of an oily deposition. The curling tendency of the layers was checked after storage for 2 hours at 55° C. in a drying cabinet (20% relative air humidity). Specimen 1 curled very strongly, specimen 2 to a lesser degree and specimens 3–5 show practically no tendency to curling.

Example 2

The same series of tests as in Example 1 is repeated, except that the layers are dried at 30° C. (air temperature). The brittleness is determined as indicated above.

RESULT

| Addition, percent: | Number of strokes |
|---|---|
| 0 (standard) | 150 |
| 5 | 580 |
| 7.5 | 620 |
| 10 | 880 |
| 20 | >1550 |

Example 3

2 g. of the color coupler of Example 1, and 10% and 20% of plasticizer, calculated on the dry weight of the gelatine, are added to 100 cc. of an 8% aqueous gelatine solution.

The layer thicknesses of the layers produced with the solution were between 20 and 22μ and the drying temperature was 22° C. The film strips were kept for 2 days under conditions of 36% relative air humidity at 22° C. and then tested with the testing apparatus which has been described.

RESULT

| Addition | Number of strokes | Viscosity of the casting solutions (discharge time) |
|---|---|---|
| 0% (Standard) | 95 | 9'11'' |
| 10% Plasticizer III | 510 | 4'13'' |
| 20% Plasticizer III | 1,100 | 2'50'' |
| 10% Plasticizer II | 340 | 5'32'' |
| 20% Plasticizer II | 1,230 | 2'12'' |

As shown in column 3, the viscosity of the casting solution falls considerably as a result of adding the plasticizer. The viscosity was measured with a discharge pipette at 36° C. The values indicated are discharge times in minutes and seconds.

Example 4

10% and 20% of plasticizer IV (calculated on gelatine) are added to 100 cc. of a photographic silver halide emulsion, containing 3 grams of silver halide and 8 grams of gelatine. The mixtures are cast onto a subbed cellulose triacetate support and the layers (thickness 18–19μ) are dried at 30° C. They were then subjected to an air conditioning for 48 hours at 36% relative air humidity and at 22° C. The brittleness is determined as described in Example 1.

RESULT

| Addition, percent: | Number of strokes |
|---|---|
| 0 (control) | 510 |
| 10 | 1120 |
| 20 | >1500 |

The layers are mechanically very stable, do not become detached from the support and are not brittle, even when very dry.

Example 5

The advantageous effect of the compounds according to the invention on the decrease of the curling tendency of photographic materials is apparent from measurements using multilayer color papers having the following composition: a blue-sensitive silver halide emulsion layer with a coupler for the production of a yellow color image incorporated therein is applied to a barytacoated paper support. A green-sensitive silver halide emulsion layer containing a coupler for the production of a magenta color image, a red-sensitive silver halide emulsion layer containing a coupler for the production of a cyan color image and a gelatine protective layer are then applied. For purposes of comparison a material of similar construction is prepared, in which 20% of compound I, based on gelatine dry weight, is incorporated into the layers in order to improve their mechanical properties. Both materials are subjected to the usual color processing operations, and after a high-gloss drying on a heated metal drum, the chord width of a paper strip with a length of 18 cm. which curls with the emulsion on the inside is measured. The mechanical properties of a material are better in proportion as it more quickly assumes the absolute flat position, i.e. again reaches the original length of 18 cm.

RESULT

| Chord width after— | 0′ | 2′ | 5′ |
|---|---|---|---|
| Comparison specimen without addition (cm) | 10 | 11.5 | 13.5 |
| Specimen with 20% of Compound I (cm.) | 12 | 14 | 14.5 |

What we claim is:
1. Gelatine plasticized with 2 to 50% by weight, based on the weight of gelatin, of a phosphoric acid ester of the formula

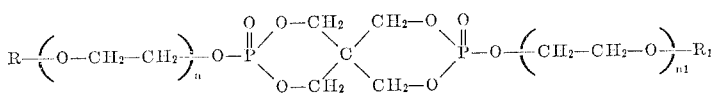

wherein R and $R_1$ are radicals selected from the group consisting of alkyl having up to 20 carbons, aryl and aralkyl, and $n$ and $n_1$ are integers between 2 and 20.

2. The combination of claim 1 in which the ester is

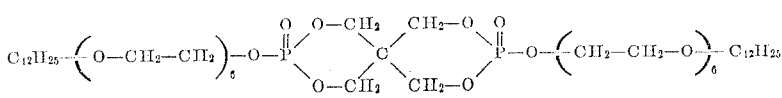

3. The combination of claim 1 in which the ester is

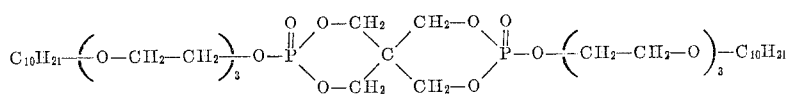

4. The combination of claim 1 in which the ester is

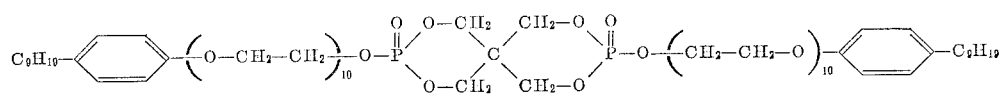

5. The combination of claim 1 in which the ester is

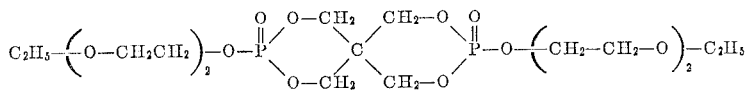

6. The combination of claim 1 in which the ester is

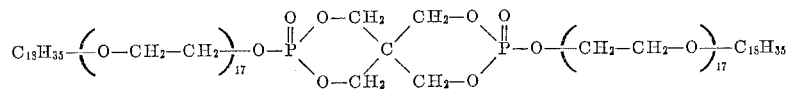

7. The combination of claim 1 in which the ester is

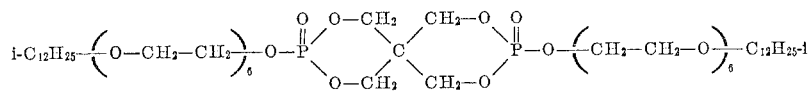

8. The combination of claim 1 in which the ester is

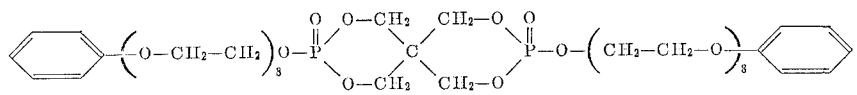

9. The combination of claim 1 in which the ester is

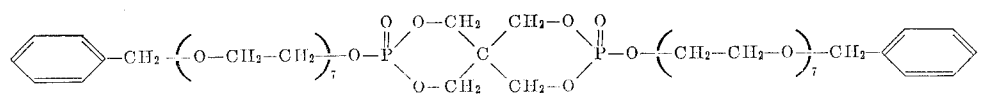

10. A composition of matter as claimed in claim 1, wherein said ester is present in amounts of 5 to 30%, based on the weight of gelatine.

References Cited

UNITED STATES PATENTS

| | | | |
|---|---|---|---|
| 2,292,022 | 8/1942 | Christopher | 260—117 |
| 2,768,080 | 10/1956 | Helmann et al. | 96—114 |
| 2,920,068 | 1/1960 | Bernhard et al. | 260—117 |
| 3,022,172 | 2/1962 | Ohba et al. | 96—114 |
| 3,053,878 | 9/1962 | Friedman et al. | 260—461 |
| 3,090,799 | 5/1963 | Wahl et al. | 260—927 |
| 3,103,530 | 9/1963 | Ratz | 260—461 |
| 3,258,338 | 6/1966 | Claeys et al. | 106—136 |

ALEXANDER H. BRODMERKEL, *Primary Examiner.*

NORMAN G. TORCHIN, CHARLES B. PARKER,
*Examiners.*

R. L. STONE, F. M. SIKORA, T. MORRIS,
*Assistant Examiners.*